US006519672B2

United States Patent
Scardamalia et al.

(10) Patent No.: US 6,519,672 B2
(45) Date of Patent: Feb. 11, 2003

(54) SHARED MEMORY APPARATUS AND METHOD FOR MULTIPROCESSOR SYSTEMS

(75) Inventors: Theodore G. Scardamalia, Round Rock, TX (US); Lynn Parker West, Austin, TX (US)

(73) Assignee: Times N Systems, Inc., Austin, TX (US)

(*) Notice: Subject to any disclaimer, the term of this patent is extended or adjusted under 35 U.S.C. 154(b) by 0 days.

(21) Appl. No.: 09/854,351

(22) Filed: May 10, 2001

(65) Prior Publication Data

US 2002/0026493 A1 Feb. 28, 2002

Related U.S. Application Data

(62) Division of application No. 09/273,430, filed on Mar. 19, 1999, now Pat. No. 6,295,571.

(51) Int. Cl.[7] .............................................. G06F 13/38
(52) U.S. Cl. ..................................... 710/317; 710/316
(58) Field of Search .............................. 710/316, 317, 710/305; 711/100, 147, 148, 149, 150, 154; 709/213, 214

(56) References Cited

U.S. PATENT DOCUMENTS

| | | | |
|---|---|---|---|
| 4,710,868 A | 12/1987 | Cocke et al. | |
| 5,341,475 A | 8/1994 | Austruy et al. | |
| 5,388,210 A | 2/1995 | Clayton et al. | |
| 5,390,316 A | 2/1995 | Cramer et al. | |
| 5,446,841 A | 8/1995 | Kitano et al. | |
| 5,471,592 A | 11/1995 | Gove et al. | |
| 5,483,640 A | 1/1996 | Isfeld et al. | |
| 5,742,785 A | 4/1998 | Stone et al. | |
| 5,765,036 A | 6/1998 | Lim | |
| 6,070,003 A | * 5/2000 | Gove et al. | ................. 710/317 |

OTHER PUBLICATIONS

Red Hot Power/4, IBM Shared Memory System™ POWER/4™ User's Guide and Technical Reference, May 1993.

* cited by examiner

Primary Examiner—Xuan M. Thai
(74) Attorney, Agent, or Firm—Gray Cary Ware & Freidenrich, LLP

(57) ABSTRACT

A memory alias adapter, coupled to a processor's memory bus, monitors processor memory accesses. Whenever a memory access corresponds to shared memory, rather than memory local to the processor, the adapter constructs a memory request message, and transmits the message over a network link to a shared memory unit. The shared memory unit performs the shared memory access and issues a response message over the network link. The memory alias adapter accepts the response message, and completes processor's memory access on the memory bus. As a result, it is transparent to the processor whether its memory access is to the local memory or to the shared memory.

9 Claims, 13 Drawing Sheets

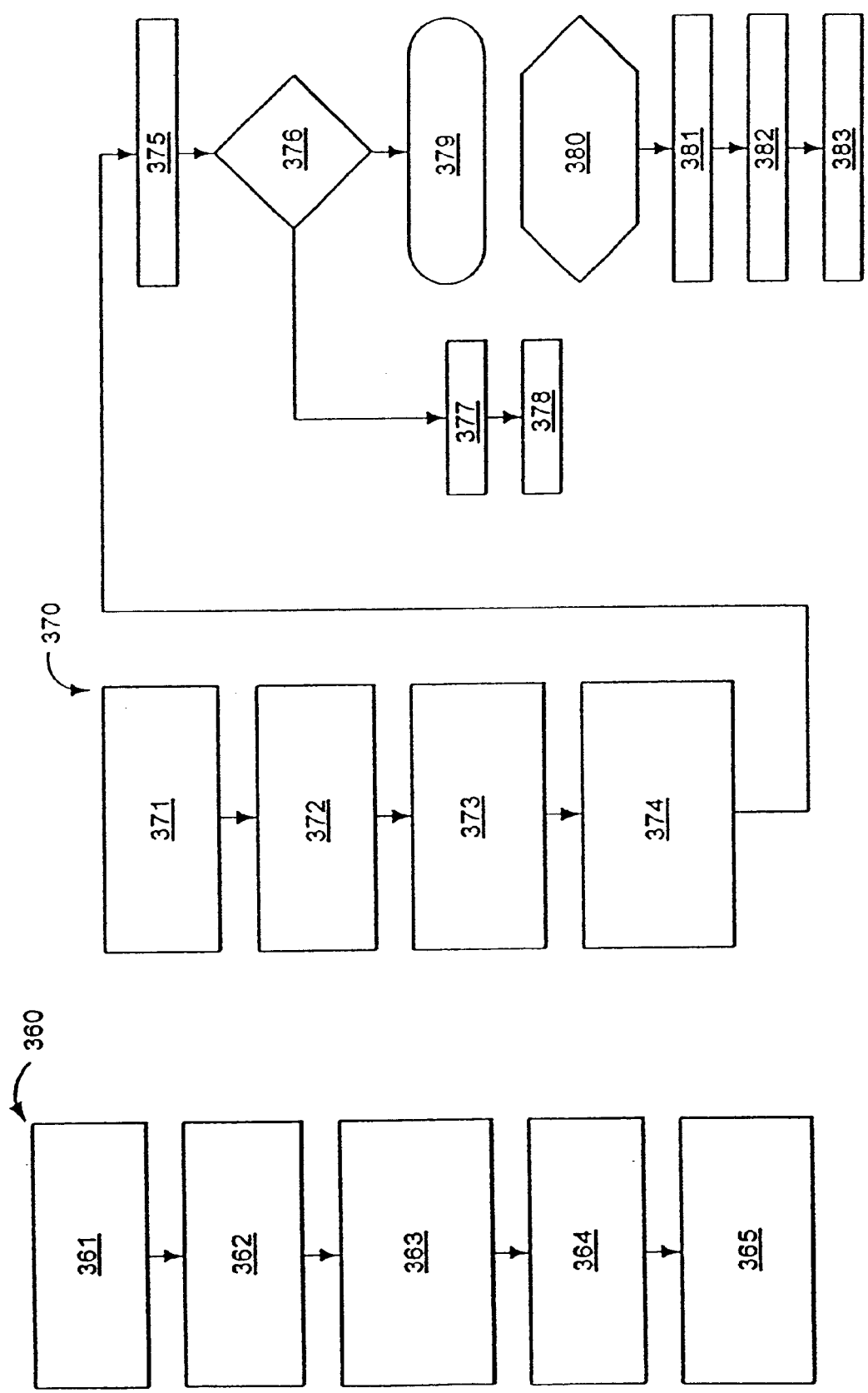

Figure 1:
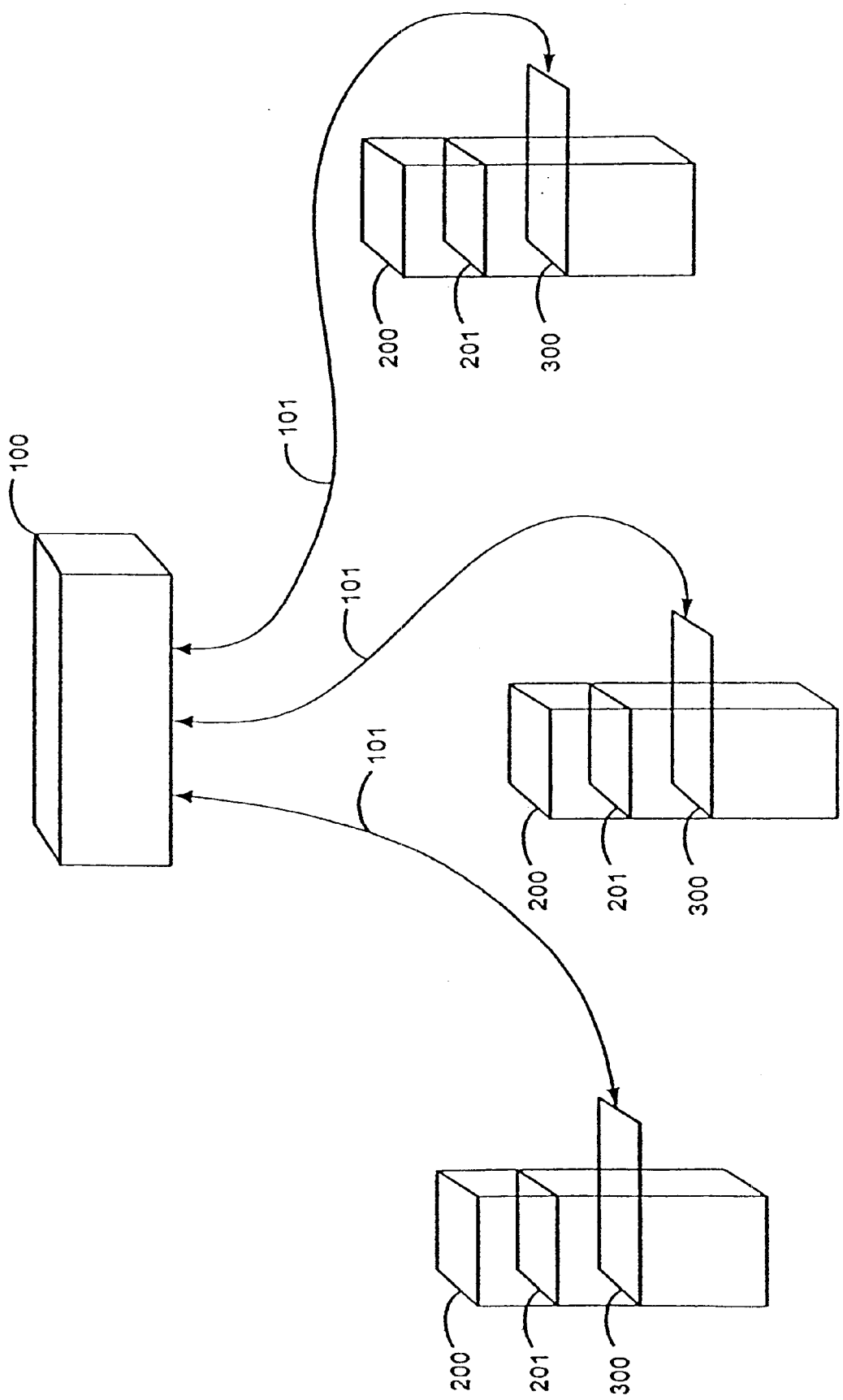

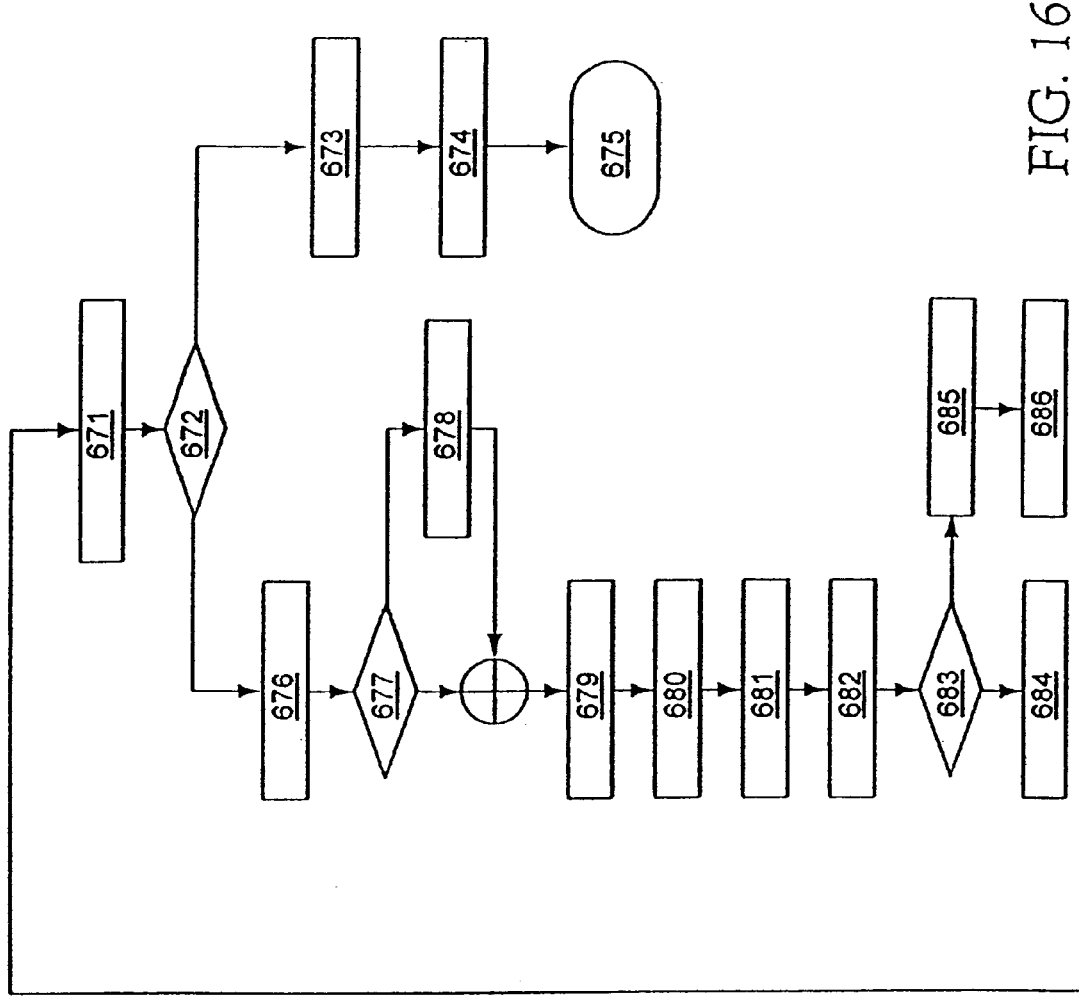
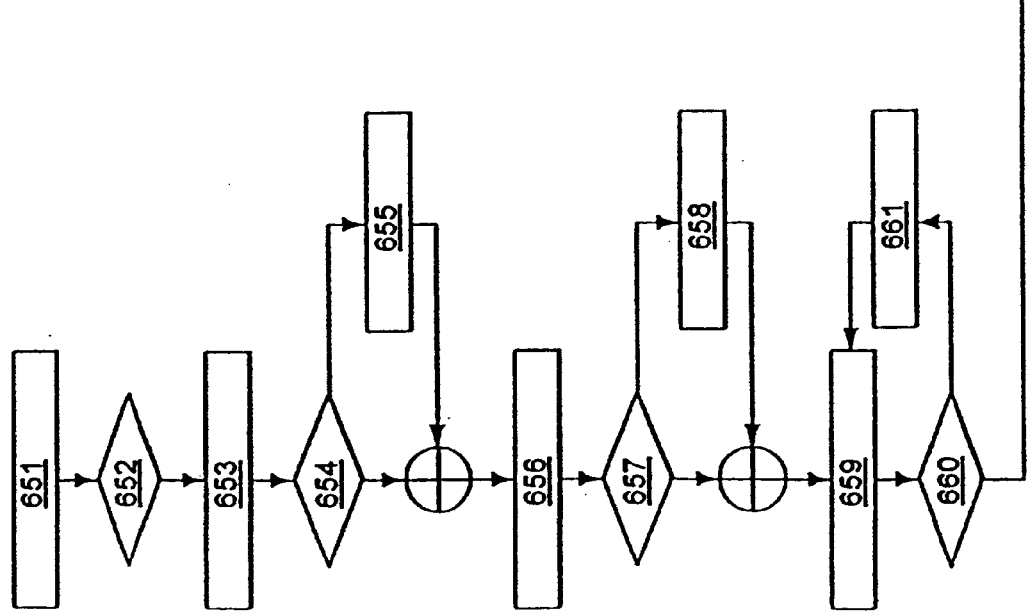
FIG. 16

SHARED MEMORY APPARATUS AND METHOD FOR MULTIPROCESSOR SYSTEMS

This is a divisional of application Ser. No. 09/273,430 filed Mar. 19, 1999 now U.S. Pat. No. 6,295,571.

BACKGROUND OF THE INVENTION

The present invention relates in general to computer systems, and, more particularly, to apparatuses for sharing memory among multiple processors.

Multiprocessor computer systems have been commercially available for the past 30 years. Typical systems have multiple processors connected, through a variety of connection fabrics, to a single, shared memory system. Likewise, all input and output (IO) devices are connected to the multiple processors through a single IO channel. The operating system for these typical SMP systems of is a single Operating System that has been parallelized to run over the processor complex.

Several disadvantages, inherent in such a system structure have prevented the systems from effectively scaling past 5 to 8 processors and have greatly elongated product delivery schedules. Those disadvantages are: 1. All memory requests must go though the connection fabric whether the data being requested is shared by multiple processors or only used by one processor, creating a bottleneck in the memory connection fabric; 2. The Operating System must be parallelized; 3. The parallel Operating System creates a great deal of extra memory requests; 4. All IO requests must go through the IO channel creating a bottleneck.

In recent years, distributed memory computers, such as Massively Parallel Processors, Clusters, and networked systems have emerged as potential solutions for the disadvantages of SMPs. Common applications of such networks include distributed computing environments, client-server systems, and server clustering implementations. In a typical LAN, information to be passed from one computer to another computer via the network is first transferred from an application running on the transmitting computer's processor to a device driver: an operating system level, software-based object. The device driver assembles the message to be transferred into packets conforming to the protocol to be used for data transmission (such as conventional TCP/IP or IPX/SPX protocols).

These packets are transferred by the device driver to a conventional network card, such as a 10 or 100 megabit-per-second Ethernet network card. The network card then transmits the data over the physical layer of the network, where a similar network card on the receiving computer captures it. This captured data is then transferred to a similar software-based device driver on the receiving computer. This device driver will typically reconstruct the message sent by the transmitting computer, by decoding and unpacking the individual protocol packets transferred over the physical layer. The reconstructed message is then made available to an application running on the receiving computer.

As can be seen from the foregoing description, one disadvantage of such typical LAN systems is the delays imposed, on both the transmitting and receiving ends, from the presence of software-based layers, such as operating systems network device and transmission protocol drivers.

The present invention overcomes the limitations of the prior art systems. The invention significantly reduces the bottlenecks in both the memory connection fabric and the IO channel and eliminates the requirement to parallelize the Operating System and maintain the standard load/store (read/write). The invention also eliminates the requirement to pass messages between processors hence significantly reducing the data transfer times.

SUMMARY OF THE INVENTION

The present invention is directed to an adapter for coupling a processor (single or multiple) system to a shared memory unit over a data link, wherein the processor system includes a data bus for access to a local memory and a expansion bus coupled to the data bus, and, the shared memory unit includes at least one bank of shared memory. The adapter comprises: a expansion bus interface coupling the adapter to the expansion bus of the processor system; an input/output port coupling the adapter to the shared memory unit via the data link; means coupled to the expansion bus interface for monitoring processor memory accesses on the data bus; means coupled to the data bus monitoring means for detecting when a monitored processor memory access is a processor memory access operation to a memory address value within a range of addresses corresponding to the shared memory; means coupled to the detecting means for translating the monitored processor memory access operation into a shared memory access request; means for outputting the shared memory access request to the input/output port and, in turn, to the shared memory unit; and means coupled to the expansion bus interface for placing a memory access completion acknowledgement indication on the standard expansion bus, whereby it is transparent to the processor system whether the memory access operation is addressed to the local memory or to the shared-memory.

In a preferred embodiment of the invention, the memory access operation may comprise at least one of a memory read operation or a memory write operation.

It is also preferred that the expansion bus interface comprises at least one of the following: a peripheral component interface bus interface, an Advanced Graphics Port bus interface, conventional memory module bus interface, or an Industry Standard Architecture bus interface. It is also contemplated that the input/output port comprises at least one of a Scalable Coherent Interface, an IEEE 1394 interface, a SCSI bus interface, an Ethernet network interface or an optimized parallel or serial interface. In one preferred embodiment, the processor system comprises a conventional IBM-compatible personal computer.

In another preferred embodiment, the processor system accesses the data bus and, in turn, the shared memory unit, via memory accesses placed upon the data bus from an unmodified conventional operating system.

It is also preferred that the unmodified conventional operating system comprises a uniprocessor build of a Windows NT or similar operating system.

In still another preferred embodiment, a combined memory space comprises the local memory of the processor system and the shared memory of the shared memory unit contains at least one memory address corresponding to a register location.

The present invention also is directed to a shared memory unit for providing shared memory to a plurality of processor systems. In such an embodiment, the shared memory unit comprises a shared memory comprising a plurality of memory banks; a plurality of input/output ports, each input/output port being connectable to a processor system by a dedicated data link; means coupled to the input/output ports for receiving a shared memory access request from a requesting processor; means coupled to the receiving means for determining the memory bank corresponding to the memory access request; connecting means coupled to the receiving means, the determining means, and the memory banks, for providing a data path between the input/output port and the memory bank associated with the memory access request; a memory controller coupled to the connecting means and the receiving means, the memory controller performing memory accesses to the shared memory bank through the connecting means in accordance with the memory access request; and means coupled to the memory controller and the input/output ports for generating a shared memory access response for transmission back to the requesting processor system.

In this preferred embodiment, the connecting means comprises a crossbar switch, which may comprise a non-blocking crossbar switch.

In a preferred embodiment of the invention of the invention, further includes means for providing atomic memory operations between at least one of the processor systems and the shared memory.

In another preferred embodiment, the invention includes a memory bus transfer controller for controlling accesses to a local portion of distributed shared memory. The memory bus transfer controller comprises: a local processor memory bus interface coupling the memory bus transfer controller to a local processor and to a memory private to the local processor; a local shared memory bus interface coupling the memory bus transfer controller to the local portion of distributed shared memory; a shared memory interconnect bus coupling the memory bus transfer controller to at least one remote memory bus transfer controller associated with at least one remote processor; first monitoring means coupled to the local processor memory bus interface for monitoring local processor memory bus accesses; first determining means coupled to the first monitoring means for determining whether a memory address associated with the processor memory bus access corresponds to one of the memory private to the local processor, the local portion of distributed shared memory, and a remote portion of distributed shared memory; second monitoring means coupled to the shared memory interconnect bus for monitoring remote processor memory access requests; second determining means coupled to the second monitoring means for determining when a remote processor memory access request corresponds to the local portion of distributed shared memory; and a memory controller coupled to the first determining means the second determining means, the local processor memory bus, and the shared memory interconnect bus. The memory controller performs a local shared memory access when the first determining means indicates that a local processor memory bus access corresponds to the local portion of distributed shared memory. This sends a shared memory access request to the shared memory interconnect bus when the first determining means indicates that a local processor memory bus access corresponds to a remote portion of distributed shared memory, and performs a local shared memory bus access when the second determining means indicates that a remote memory access request corresponds to the local portion of distributed shared memory; whereby it is transparent to the local processor whether each of its memory access operations is addressed to the local memory, the local portion of distributed shared memory, or a remote portion of distributed shared memory.

The invention is also directed to a method for performing processor memory accesses to a shared memory unit using an adapter coupling a processor system to the shared memory unit via a data link. The processor system includes a standard expansion bus. The adapter has a standard expansion bus interface coupling the adapter to the standard expansion bus of the processor system and an input/output port coupling the adapter to the data link and, in turn, to the shared memory unit. The method comprises the steps of; A) monitoring processor memory accesses on the standard expansion bus; B) detecting when a monitored processor memory access is a processor memory operation to a memory address value within a range of addresses corresponding to the shared memory; C) translating the processor memory operation into a shared memory access request; D) outputting the shared memory access request to the input/output port and, in turn, to the shared memory unit via the data link; and E) placing a shared memory access acknowledgement indication on the standard expansion bus; whereby it is transparent to the processor whether the memory access operation is addressed to the local memory or to the shared memory.

BRIEF DESCRIPTON OF THE DRAWINGS

Figure 2:
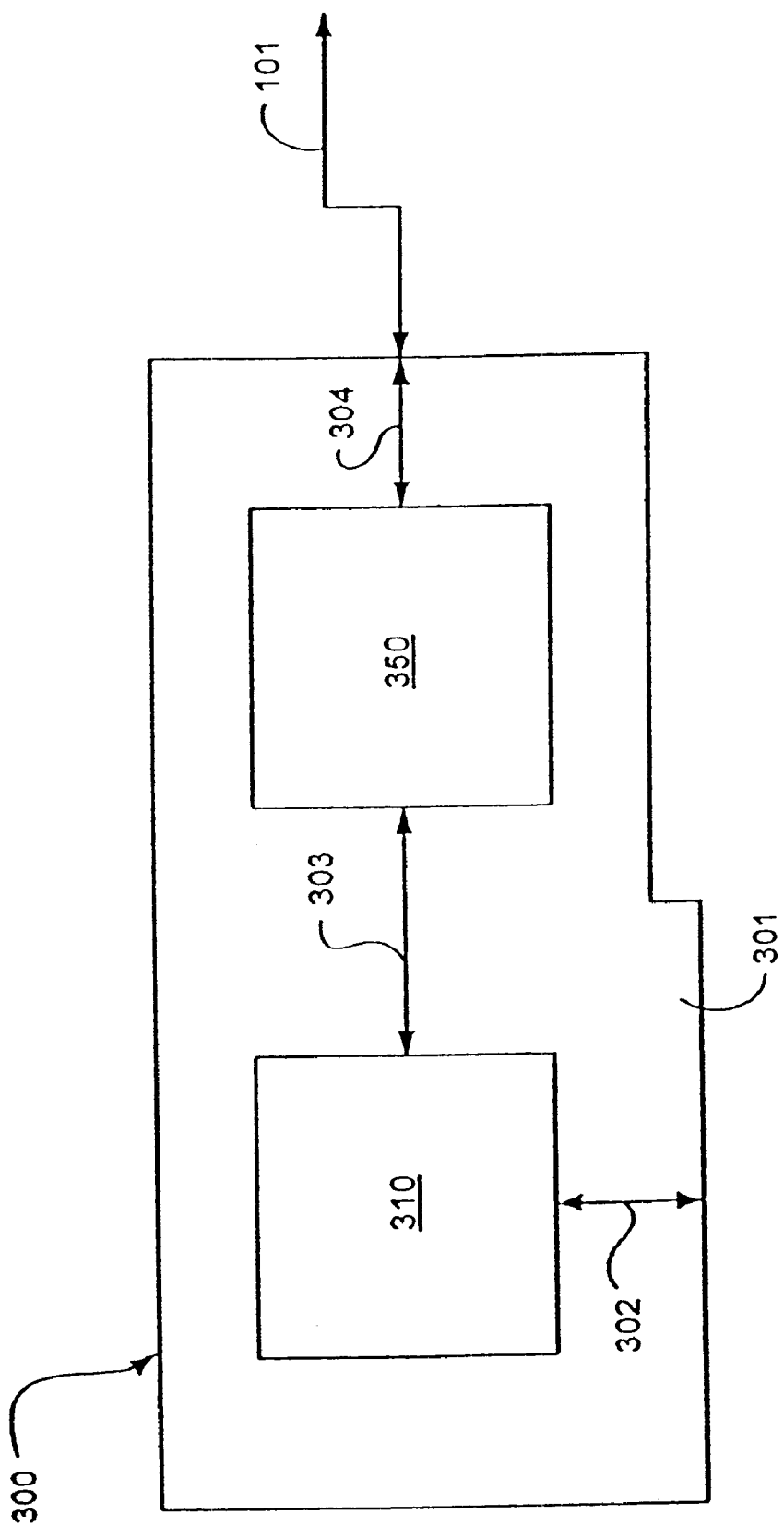
Figure 3:
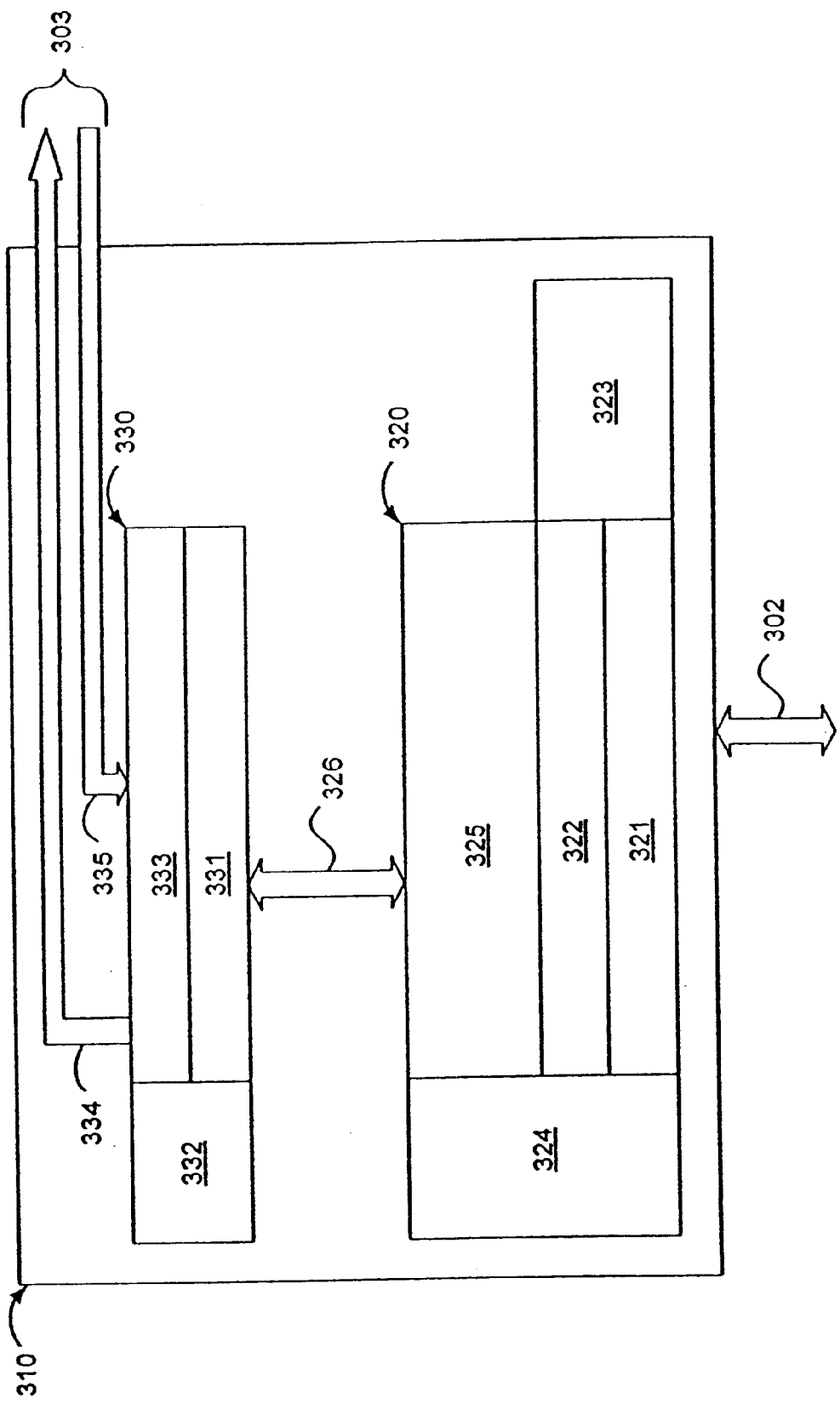
Figure 4:
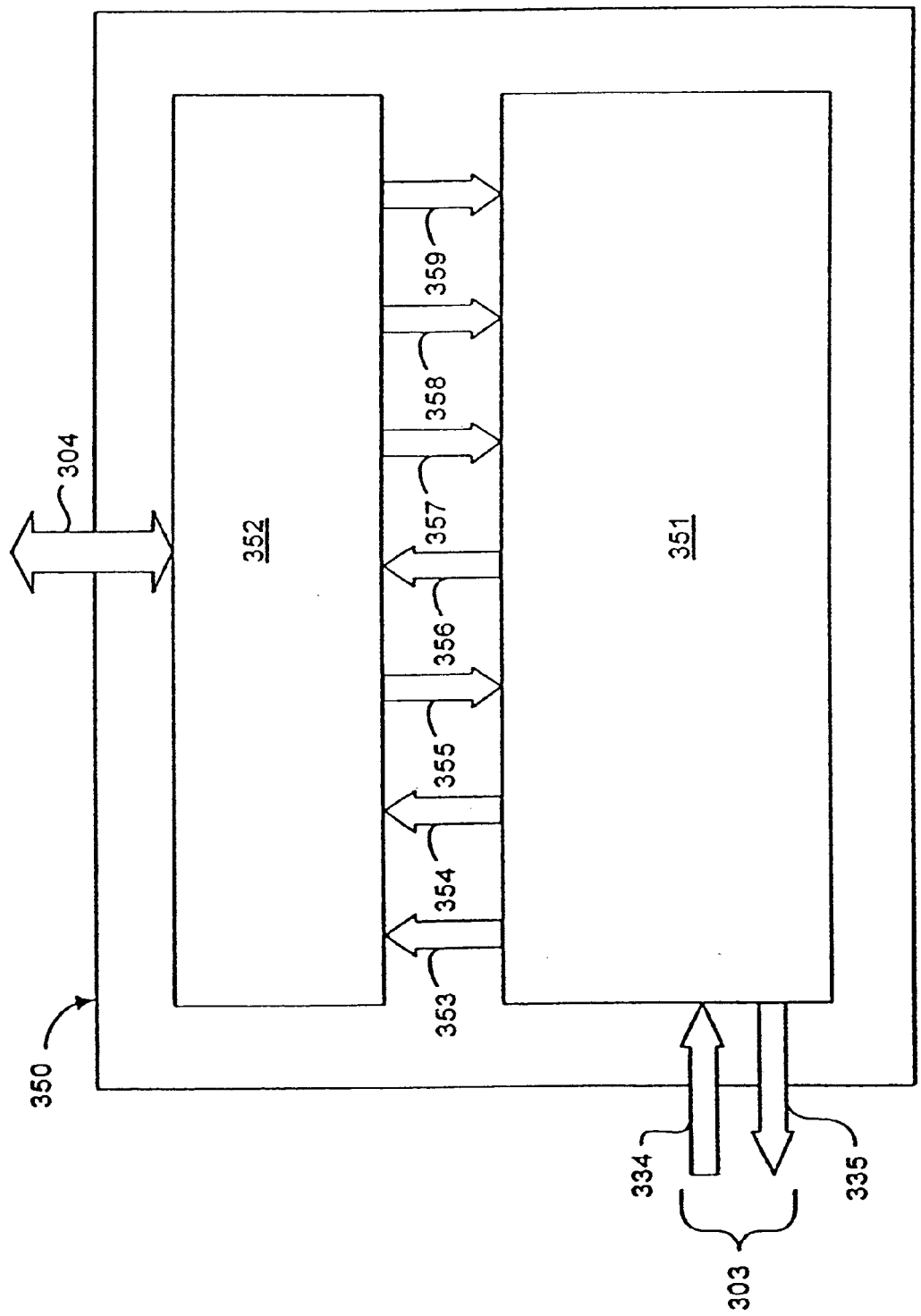
Figure 7:
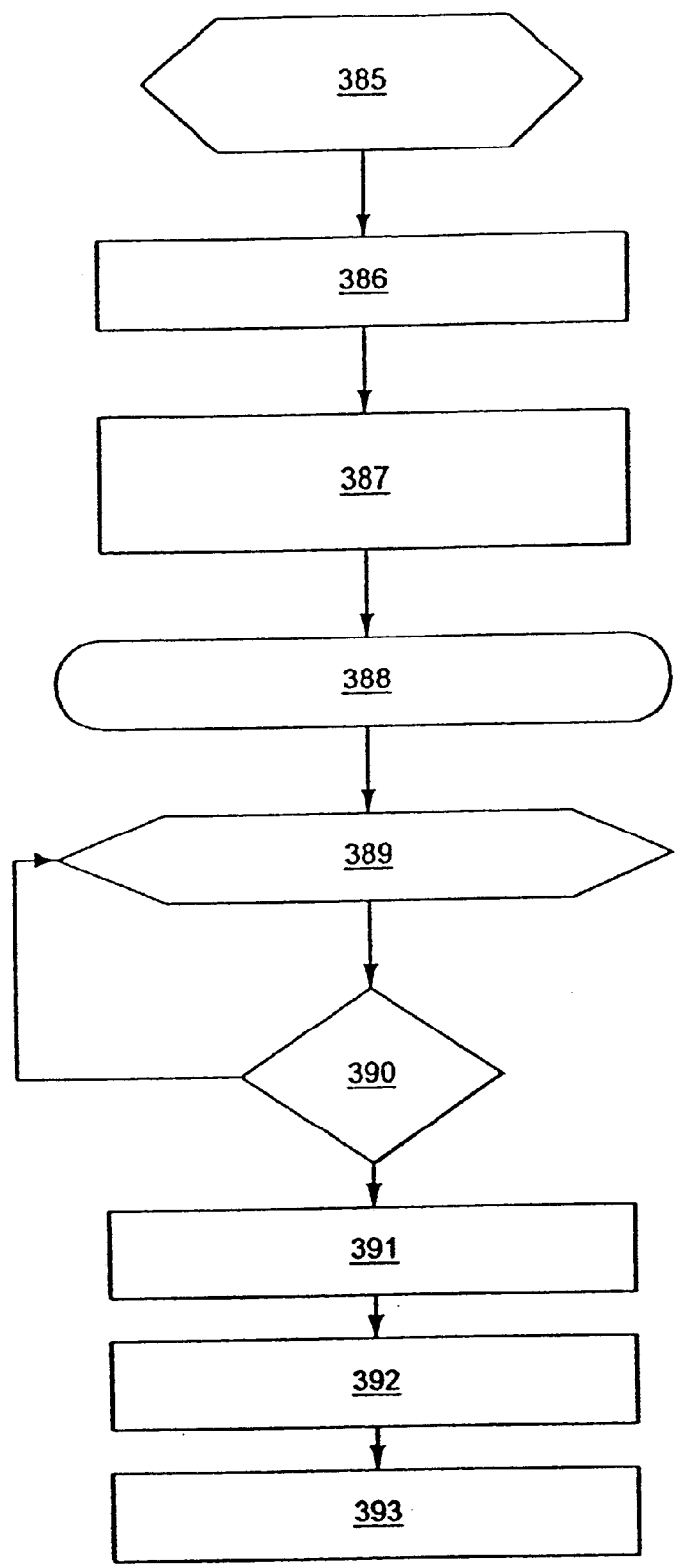
Figure 8:
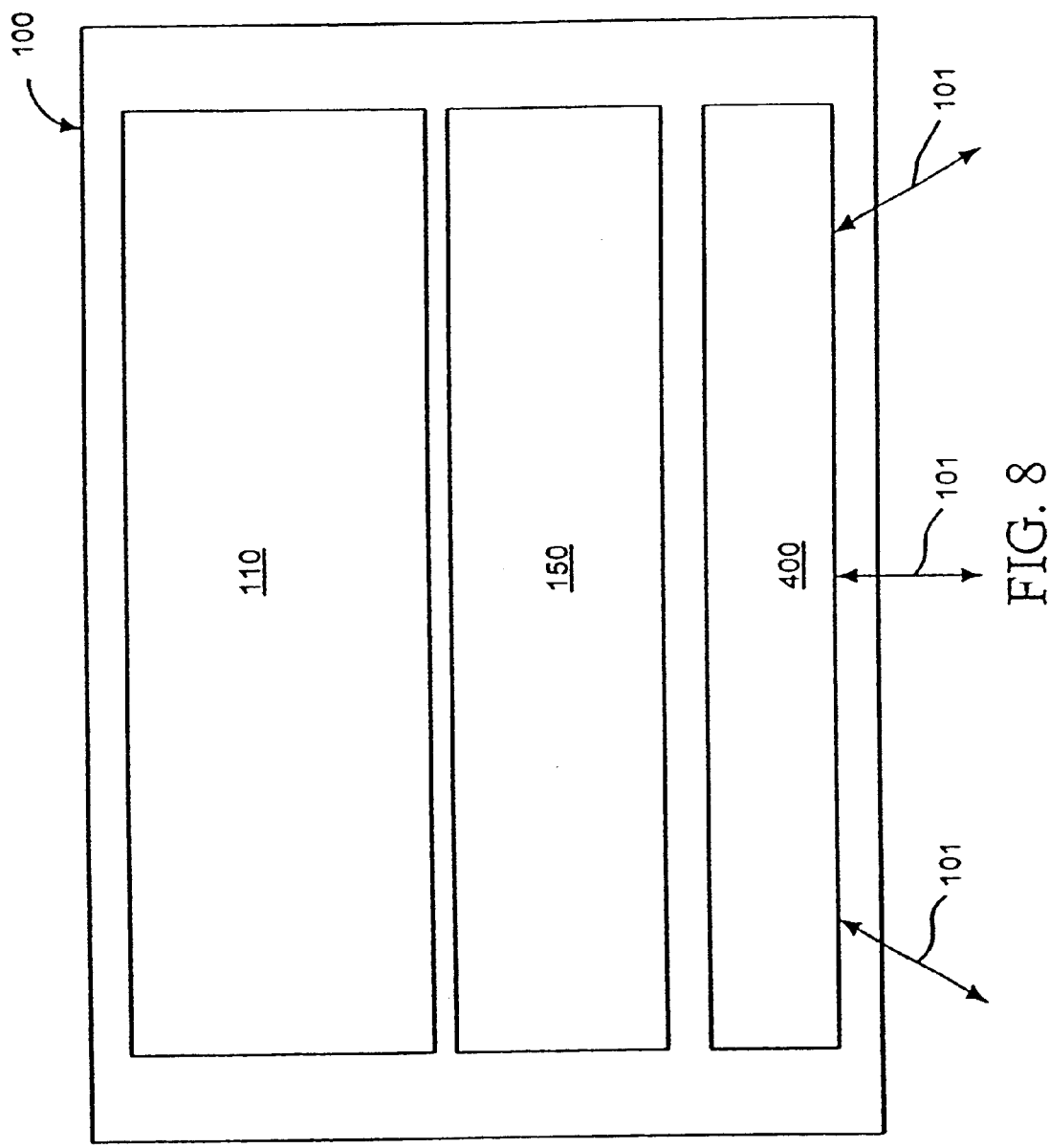
Figure 9:
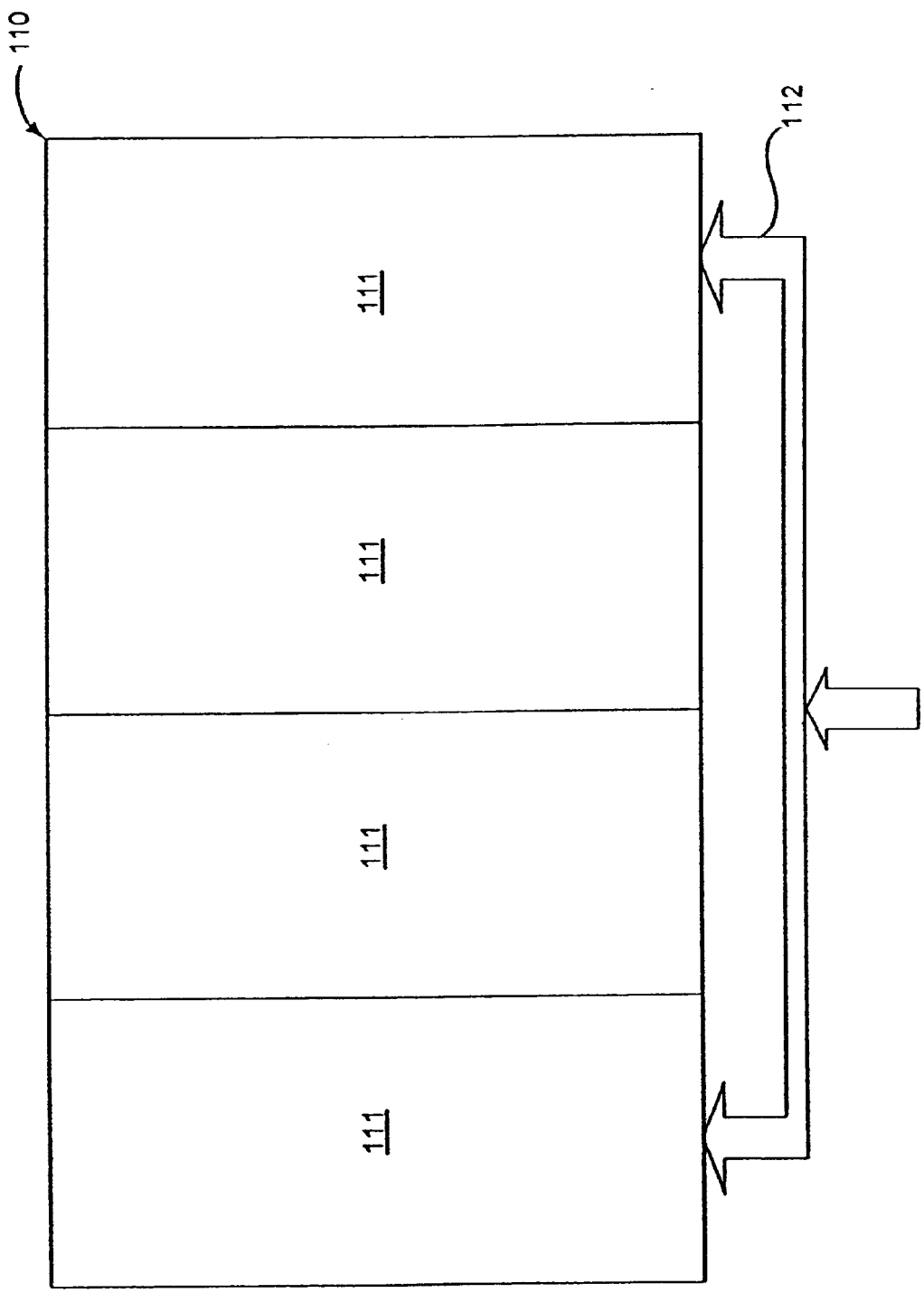
Figure 10:
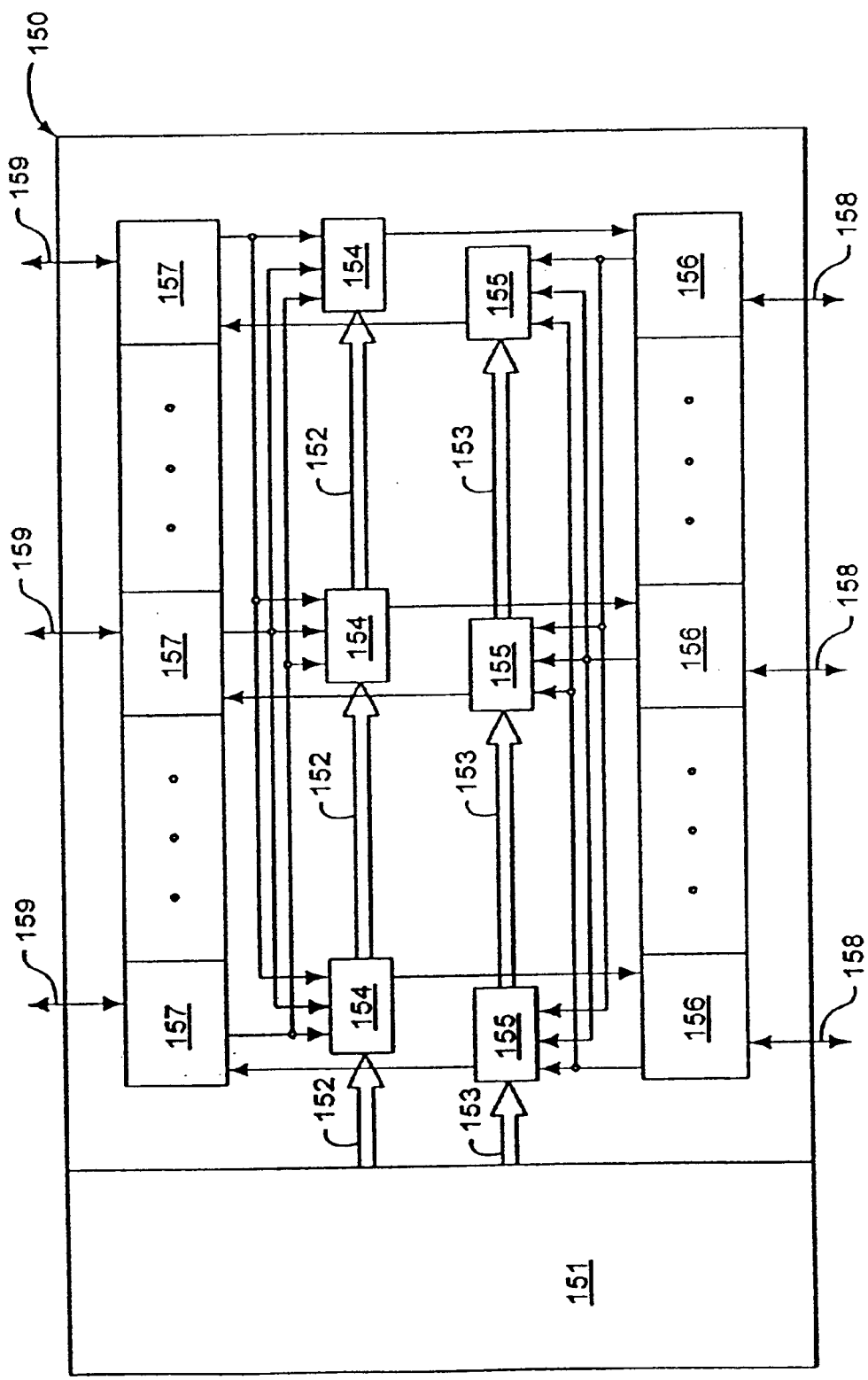
Figure 11:
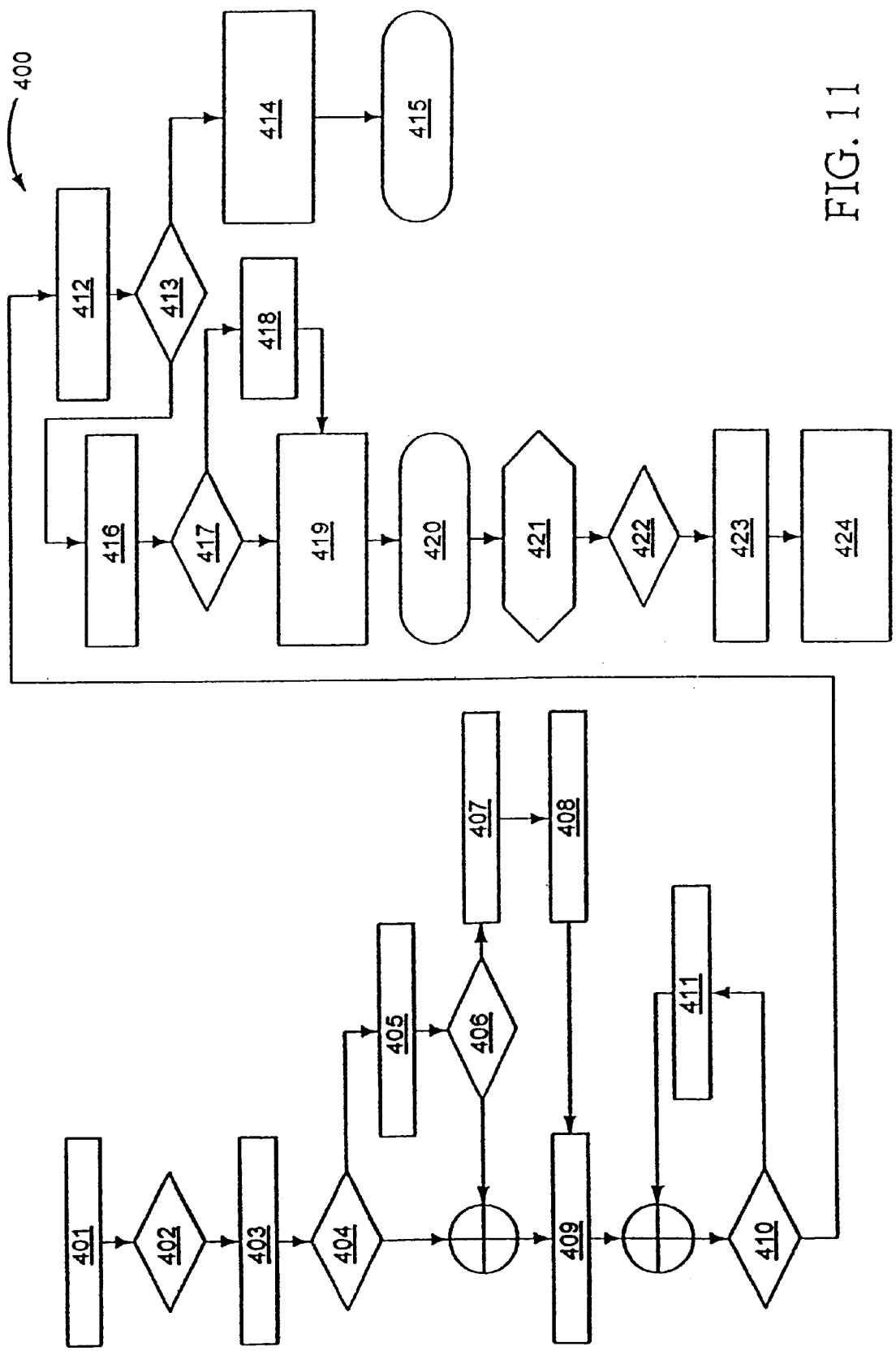
Figure 13:
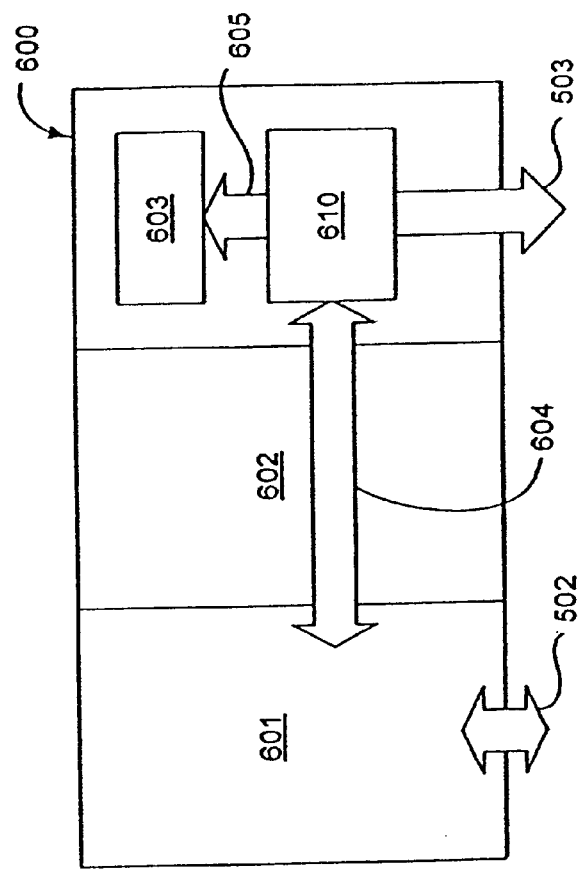
Figure 12:
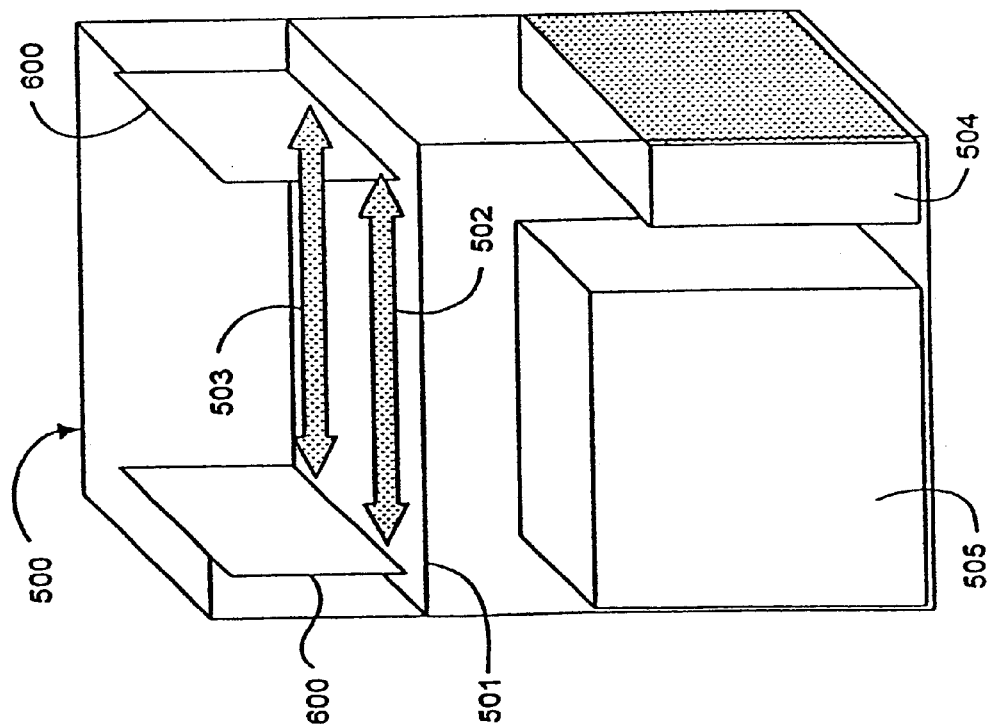
Figure 15:
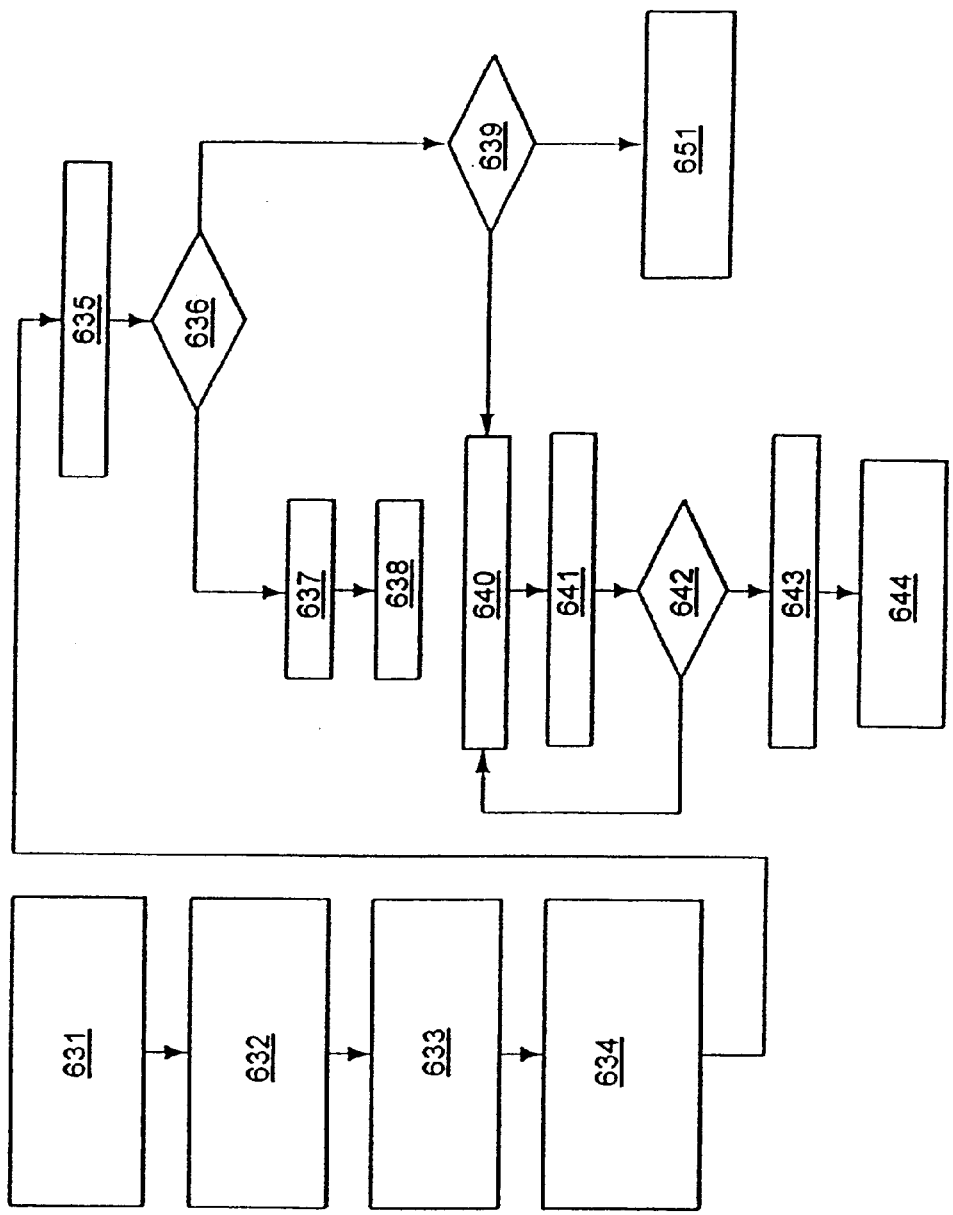
Figure 14:
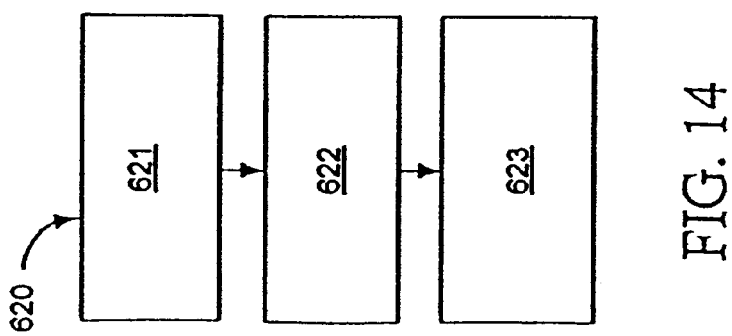

FIG. 1 of the drawings is a block diagram of an embodiment of the shared memory system, showing a component based implementation having centralized shared memory;

FIG. 2 of the drawings is a schematic diagram of the memory alias adapter of FIG. 1;

FIG. 3 of the drawings is a schematic diagram of the address detect ASIC of FIG. 2;

FIG. 4 of the drawings is a schematic diagram of the interface control ASIC of FIG. 2;

FIG. 5 of the drawings is a state diagram of the system bring-up sequence of the memory alias adapter of FIG. 2;

FIG. 6 of the drawings is a state diagram of a portion of the operational mode of the memory alias adapter of FIG. 2;

FIG. 7 of the drawings is a state diagram of a further portion of the operational mode of the memory alias adapter of FIG. 2;

FIG. 8 of the drawings is a schematic diagram of the shared memory unit of FIG. 1;

FIG. 9 of the drawings is a schematic diagram of the memory banks of FIG. 8;

FIG. 10 of the drawings is a schematic diagram of the crossbar switch of FIG. 8;

FIG. 11 of the drawings is a state diagram showing the operation of the state machine controller portion of the memory controller/processor interconnect of FIG. 8;

FIG. 12 of the drawings is a block diagram of another embodiment of the shared memory network, showing an integrated implementation with distributed shared memory;

FIG. 13 of the drawings is a schematic diagram of a processor card of FIG. 12;

FIG. 14 of the drawings is a state diagram of the system bring-up process of the processor card of FIG. 13;

FIG. 15 of the drawings is a state diagram of the system operation portion of the memory bus transfer controller of FIG. 13; and FIG. 16 of the drawings is a state diagram of the tag, arbitration and coherence portions of the memory bus transfer controller of FIG. 13.

DETAILED DESCRIPTION OF THE DRAWINGS

While the invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiments illustrated.

The present shared memory system is shown in FIG. 1 as comprising shared memory unit (SMU) 100, and multiple computer systems 200, each connected by links 101, to the SMU. The SMU is a free standing unit containing shared memory accessible by all connected computer systems 200 via its I/O ports and a cable or bus.

Each computer system 200 may comprise a conventional personal computer or workstation, such as an IBM-PC compatible computer. Each computer system 200 includes conventional local memory 201, which may comprise one or more memory modules closely coupled to the processor on the system motherboard and alternatively, or in addition, one or more memory expansion boards is coupled to the system bus.

As shown in FIG 1., each computer system connected to the SMU includes a memory alias adapter (MAA) 300 (shown extended for illustrative purposes only) coupled to the computer system's processor. Each MAA provides full physical, electrical and operational emulation of a traditional memory device, such as a memory board coupled, for example, to a standard computer bus, such as the PCI (Peripheral Component Interconnect) bus. Alternatively, the MAA may comprise a SIMM/DIMM memory module, closely coupled to the computer's processor via a socket proximate the processor. Each MAA includes an I/O port to connect the MAA to the SMU 100 via a cable or bus.

Within each computer system, the MAA is assigned a (preferably contiguous) range of memory addresses. Whenever a computer system performs a memory-write operation to a region of memory corresponding to the. physical address space locally assigned to the MAA 300 (as opposed to local memory 201), the MAA responds by placing the write data, together with the associated address, upon the network link to the SMU. The SMU responds by storing the specified write data at the appropriate address within its own memory. In this manner, memory write operations that appear to be local operations to the computer's processor are, in fact, memory write operations to a central shared memory unit. Whenever Whenever a computer system performs a memory-read operation to a region of memory corresponding to the physical address space locally assigned to the MAA, the MAA responds by sensing a request for data, together with the associated address to the SMU. The SMU responds to this request by retrieving the requested data from its shared memory, at the requested address. The requested data is then sent back to the requesting computer system. The computer system's MAA receives the requested data, and places it upon the computer's system bus. In this manner, memory read operations that appear to be local operations to the computer's processor are, in fact, memory read operations from a central shared memory unit.

Similarly, whenever a computer system performs a memory-write operation to a region of memory corresponding to the physical address space locally assigned to the MAA, the MAA responds by sending a data write request, including the associated address and data to the SMU. The SMU responds to this request by storing the messaged data into its shared memory, at the specified address. An acknowledgement is then sent back to the requesting computer system. link. The computer system's MAA receives the acknowledgement, and places an appropriate handshake signal upon the computer's system bus in order to complete the memory access cycle. In this manner, memory write operations that appear to be local operations to the computers processor are, in fact, memory write operations to a central shared memory unit.

Although three computer systems 200 are shown coupled to SMU 100 in FIG. 1, it should be noted that the present architecture is scalable, such that any number of computer systems may be linked to the SMU; provided, of course, that the SMU itself is scaled to have sufficient I/O ports to accommodate each computer system 200.

A preferred embodiment of MAA 300, implemented as a PCI-bus based card, is shown in FIG. 2 as comprising address detect ASIC (Application Specific Integrated Circuit) 310 and interface control ASIC 350. A conventional PCI edge connector 301 is provided for exchanging address, data and control signals with the system processor when MAA 300 is inserted into an empty PCI slot within the computer system Address detect ASIC 310 provides overall PCI bus interface functions for the MAA, coupling to the PCI edge connector via on-board bus 302. This ASIC senses PCI bus activity, determining when processor write (store) operations or read (load) operations correspond to memory addresses assigned to the MAA and, in turn, to the SMU. When such processor operations are detected, a transaction manager within ASIC 310 passes the address and data corresponding to the operation to interface control ASIC 350 via a dedicated interface 303.

Interface control ASIC 350 provides link management functions between the MAA and the SMU in the form of memory read/write requests sent to the SMU through I/O port 304 and over the cable or bus 101. For memory write operations, interface control ASIC 350 receives the operation's associated address and data information from address detect ASIC 310 via interface 303. Interface control ASIC 350 translates the address and data into a shared memory write request, and handles transmitting the message over the physical layer of the connection to the SMU. The interface control ASIC receives response messages, such as indications of successful writes into shared memory, from the SMU. Such acknowledgements are passed back to address detect ASIC 310 via interface 303. Address detect ASIC 310 uses this acknowledgement to complete the overall write operation occurring on the PCI bus.

Similarly, for memory read operations, interface control ASIC 350 receives the operation's associated address information from Address detect ASIC 310 via interface 303. Interface control ASIC 350 translates the address into a shared memory read request, and handles transmitting the request over the physical layer of the connection to the SMU. The interface control ASIC receives response requests, such as those containing data stored within the requested address of the SMU's shared memory, from the SMU. The data is passed back to address detect ASIC 310 via interface 303. Address detect ASIC 310, in turn, places this data upon the PCI bus via edge connector 301 to complete the overall read operation occurring on the PCI bus.

Address detect ASIC 310 is shown in further detail in FIG. 3 as comprising conventional PCI interface 320 and transaction unit 330. PCI interface 320, which may be a PCI target/slave unit, or a unit capable of mastering the PCI bus, may comprise an "off the shelf" intellectual property core, obtainable commercially from a number of vendors, including Xilinx, Inc. Alternatively, PCI interface 320 may be separated from ASIC 310 as a stand-alone component. Such devices are commercially available, from vendors such as Applied Microcircuits Corporation.

As shown in FIG. 3, a typical PCI interface 320 includes a PCI protocol handler 321, PCI configuration manager 322, PCI configuration storage 323, buffer memory 324, and PCI to local I/O bus interface 325. Protocol handler 321 provides the overall interface to the PCI physical layer, via on board bus 302. The PCI configuration manager 322 provides the required PCI-compliant configuration registers (Vendor ID, Device ID, memory requirements, etc.), polled by the host's BIOS system during power-on initialization. The device-specific data is stored within PCI configuration storage 323. PCI to local I/O bus transfer interface 325 provides a bridge between the complex PCI bus and the simplified, internal local I/O bus 326. A buffer memory 324 provides mailbox registers and pass-through buffering between the PCI bus 302 and local bus 326.

The foregoing discussion of the MAA has focused on the use of a Peripheral Component Interface (PCI) bus to electrically and physically couple the MAA to a standard PCI expansion bus of a personal computer or computer workstation, such as an IBM-PC compatible computer. However, it is also contemplated by the present invention that other standard expansion busses may be used. By way of example, rather than limitation, the MAA may be coupled to the Advanced Graphics Port (AGP) of a computer, rather than the PCI bus. Indeed, in many applications, the AGP standard expansion bus may be preferred over the PCI, inasmuch as the AGP generally provides a faster, higher bandwidth connection to the processor itself Whenever an AGP port is used, the address detect ASIC should include a conventional AGP interface, rather than a conventional PCI interface. Referring to FIG. 3, PCI interface 320 within address detect ASIC 310 is replaced with a conventional AGP interface. Such AGP interfaces are commercially available in the form of a synthesizable core for incorporation as a component within an overall ASIC. Commercially available AGP cores include the Super-AGPTargetCore from Integrated Intellectual Property, Inc. of Santa Clara, Calif., as well as the AGP Master Core product from Phoenix Technologies, Ltd. Of San Jose, Calif.

Of course, the use of an AGP bus interface, rather than a PCI bus interface, also requires the substitution of a suitable AGP edge connector for the PCI edge connector 301, shown in FIG. 2.

Moreover, it is also contemplated that other existing and forthcoming standard expansion bus interfaces may be used to couple the MAA to a personal computer's processor data bus and, in turn, the processor itself. For example, the Industry Standard Architecture (ISA) bus may be used, although its use is generally not preferred, since the speed of this bus is relatively slow. Moreover, the standard memory expansion bus present on most personal computer motherboards, in the form of SIMM/DIMM memory expansion sockets, may also be used.

Whichever standard expansion bus is chosen, a suitable matching bus interface must be included within the address detect ASIC of the MAA, as well as a suitable matching edge connector on the MAA circuit card.

Transaction unit 330 is shown in FIG. 3 as including local I/O bus interface 331, buffer memory 332 and transaction manager 333. Local I/O bus interface provides the physical interface to local I/O bus 331 accepting, among other things, processor write and processor read operations. Transaction manager 333 monitors the accepted local I/O bus operations, looking for operations associated with the shared memory region of the local processor's overall memory map. Transaction manager 333 contains an address limit register, containing a value representing a boundary address between the top of memory local to the present processor, and higher memory addresses, corresponding to shared memory contained within the SMU. The transaction manager also contains an address request register, for storing the address corresponding to the current memory access operation on the PCI bus, and a magnitude comparator coupled to these two registers for comparing their relative values. Buffer memory 332 provides storage for ongoing transactions within the transaction manager.

Addresses and corresponding data (for write operations) are passed from the transaction manager to the interface control ASIC via a dedicated interface 303. Interface 303 includes paths for both SMU memory requests 334 and SMU memory responses 335. For SMU read operations, the requests include the SMU memory address, and the responses include the contents of the relevant SMU memory location For SMU write operations, the requests include both the SMU memory address and the data to be written, and the responses include acknowledgements that the data has been successfully written.

Interface control ASIC 350 is shown in further detail in FIG. 4 as comprising link manager 351 and I/O port physical interface 352. Link manager 351 provides overall processing of SMU memory access from the Memory Alias Adapter. This ASIC 350 is coupled to the address detect ASIC via interface 303, including paths for both SMU memory requests 334 and SMU memory responses 335. Among other operations, the link manager maps SMU memory requests into messages suitable for transmission over bi-directional data port 304 and, in turn, the network link between the MAA and the SMU. This preferably includes the generation of error detection and correction information within the messages, such as conventional Cyclical Redundancy Check (CRC) information.

In a preferred embodiment, the link manager is controlled by traditional, dedicated state machine circuitry within the ASIC. Alternatively, a conventional microprocessor core may be included within the ASIC, with microprocessor firmware stored within the ASIC controlling the link operations between the ASIC and the SMU. Such microprocessor cores are commercially available, such as the MCORE family from Motorola, Inc.

As shown in FIG. 4, physical interface 352 provides the bridge between the link manager 351 and data port 304 and, in turn, the connection link between the MAA and the SMU. The choice, and design of physical interface 352 depends upon the choice of physical interconnect to the SMU. In a preferred embodiment, for very close proximity to a crossbar switch, a parallel, high speed connection link is recommended, such as the ANSI/IEEE standard Scalable Coherent Interface (SCI). In such cases, physical interface 352 comprises a conventional SCI interface.

Moreover, other high speed parallel connections between the MAA and the SMU may also be used. By way of example, rather than limitation, any of the several varations of the Small Computer System Interfaces (SCSI) may alternatively be used, including SCSI, SCSI2, UltraSCSI, etc. Whichever interface is chosen, a suitable physical interface device should be used for physical interface 352. For example, if UltraSCSI is chosen, a commerically available host adapter may be used for physical interface 352, such as the AIC-7895 product from Adaptec, Inc. of Milpitas, Calif.

Where longer physical connection distances between the MAA and the SMU are necessary or desirable, a suitable serial link may alternatively be used. By way of example, rather than limitation, suitable serial links include the Institute of Electrical and Electronic Engineers (IEEE) standard 1394 (also shown as FireWire) and Ethernet. When IEEE-1394 is chosen, physical interface 352 preferably comprises a conventional IEE-1394 host adapter device, such as the AIC-5800 device from Adaptec, Inc. of Milpitas, Calif. When Ethernet is chosen, physical interface 352 preferably comprises a conventional Ethernet media access controller (MAC) and Ethernet physical interface (PHY). Combined MAC and PHY devices are commercially available, such as the 82558 device from Intel Corporation of Santa Clara, Calif. Several types of data are passed between link manager 351 and physical interface 352. As shown in FIG. 4, link manager 351 issues SMU access requests 353 and link-level requests 354 to the physical interface. The physical interface will respond with access grant signals 355, which, in turn, causes the link manager to issue an acknowledgement 357. When appropriate, the physical interface will issue link-level responses 3 58 and network system configuration information 359 to the link manager, which issues acknowledgements 356.

State diagrams of the operation of the MAA are shown in FIGS. 5 through 7. FIG. 5 shows the system bring-up sequence 360 for the MAA. In state 361, the local memory in the individual processors in the overall system is detected. In state 362, the amount of local memory in each processor is mapped. In state 363, the minimum and maximum local memory addresses for the processor is established. In state 364, the local/shared memory transition address is selected. Finally, in state 365, this local/shared memory transition address is stored into the address limit register of the transaction manager portion of the MAA's address detect ASIC.

Following the system bring-up sequence, the MAA enters operational mode 370, as shown in FIGS. 6 and 7. Referring to FIG. 6, a shared memory access operation begins in state 371, where the processor issues a data request, in the form of a memory read (load) or memory write (store) operation. In state 372, the processor issues the memory address for the data request upon its address bus. In state 373, PCI bridge circuitry, typically proximate processor on its motherboard, translates the data request into PCI, bus signals, which are made available to the MAA in its PCI bus slot. In state 374, the MAA loads the address from the PCI bus into its address request register within the address detect ASIC.

In state 375, the contents of the address request register are compared to the contents of the address limit register. Action is taken, based upon the output of this comparison, within state 376. If the contents of the address request register are less than the contents of the address limit register, transition is taken to state 377. Within state 377, the current PCI bus transaction is deemed to be a local access, requiring no further MAA intervention. Transaction is taken to state 368, where MAA processing of the current PCI bus operation is halted. The MAA will then await the next PCI bus operation, which will begin again at state 371. If, however, the contents of the address request register is greater than or equal to the contents of the address limit register, transition is taken from state 376 to state 379. In state 379, the current PCI bus operation is deemed to be a shared memory access. The contents of the address detect register is passed from the address detect ASIC to the interface control ASIC, together with an indication of whether the current operation is a memory read or a memory write. If the current operation is a memory write, the data to be written is also passed to the interface control ASIC at this time.

The operation of the interface control ASIC, governed by the state machine controller within its transaction manager, is shown in FIG. 7. Whenever it is idle, the controller stays within state 385, awaiting data from the address detect ASIC. When an address (and associated data, for write operations) is received from the address detect ASIC, transition is taken to state 386. Within state 386, an address tag is generated. Any suitable hashing algorithm may be used to generate the tag, which is used as an index for storing information relating to the pending operation within the interface control ASIC's buffer memory. Next, within state 387, a connection to the SMU (via the ASIC's physical interface and the dedicated network link) is requested. The system will remain within state 387 until a grant message is received, at which time a transition is taken to state 388. Within state 388, the SMU memory address, together with the corresponding data (for memory write operations), is sent to the SMU. If the current operation is a memory write operation, an acknowledgement is sent from the interface control ASIC to the address detect ASIC at this time, indicating a successful shared memory write operation. In a preferred embodiment, the MAA is capable of handling multiple outstanding (i.e., simultaneous and overlapping) connection requests to the SMU.

If, however, the current operation is a memory read operation, transition is taken from state 388 to state 389, where the MAA waits for a response from the SMU. In state 390, the MAA tests to see if an SMU response has been received by the physical interface portion of the interface control ASIC. If no response is received, transition is taken back to state 389. If, however, a response is received, transition is taken to state 391, where the tag portion of a received request from the SMU is matched against the tags associated with pending requests, stored within the ASIC's memory buffer. In state 392, the data from the request received from the SMU is placed on the internal data bus connecting the interface control ASIC and the address detect ASIC. In state 393, a link level response message is issued to the address detect ASIC, indicating that the requested data from the SMU is available. At this point, the interface controller ASIC's state machine has completed the shared memory read operation, and transition is taken back to the idle state 385 to await the next request from the address detect ASIC.

Referring back to FIG. 6, the link level response request, including the data requested from the specified SMU memory address, is received by the address detect ASIC at state 380. In state 381, this ASIC asserting the PCI TRDY signal and then transition is taken to state 382, where the requested data from the SMU is placed upon the PCI data bus. Finally, in state 383, the processor loads the requested data into one of its internal operations, completing the shared memory read operation.

In a preferred embodiment, the MAA is coupled to a computer running a conventional uniprocessor operating system, such as a uniprocessor build of the Windows NT operating system, distributed by; Microsoft Corp. of Redmond, Wash. A set of operating system (OS) enhancements, in the form of an operating system extension layer, is employed to facilitate use of the MAA and the SMU by programmers of applications running on the operating system. The OS extension layer exposes an application programming interface (API) for use by the application programmer. Among other things, the API permits the programmer to specify the range of local memory addresses which actually correspond to external physical memory located within the SMU. The API exposes functions which permit the user to define, allocate, and manage the SMU's memory.

The OS extension layer, in turn, makes low-level calls to another API, provided by the operating system kernel, including kernel-mode and hardware abstraction layer (HAL) API calls. In this manner, the OS extension layer forms a bridge between the user applications and the operating system, facilitating the application programmer's usage of shared memory, supplied to the computer by the SMU via the computer's local MAA.

As an alternative to using OS extension layer, a modified computer system Basic Input/Output Operating System (BIOS) may be used to make the shared memory of the SMU available to applications running on the unmodified operating system. A fundamental function of most system BIOS programs is to test local memory, and inform any subsequently bootstrapped operating system of the amount of available memory, Since a conventional BIOS is not cognizant of the additional memory within the SMU and made available to the processor via its local MAA, the conventional BIOS only indicates the amount of local memory.

However, a system BIOS may be readily modified to indicate to any subsequently-booted operating system that there is an amount of available memory which comprises an aggregate of the physical memory coupled to the motherboard and the total physical memory of the SMU, available via the standard expansion bus to which the MAA is coupled.

For example, assume a particular computer system has 128 Megabytes (MB) of local memory, and includes an MAA coupled to its PCI bus. The MAA, in turn, is linked to an SMU having an additional 128 MB of memory. The modified system BIOS would be hard coded to inform any subsequently-booted operating system that there is a total of 256 MB of (apparently) local memory—128 MB coupled to the local memory bus, and 128 MB coupled to the local PCI bus.

Applications written for computer systems with a modified system BIOS must also be "hard-coded" to some degree. In the foregoing example, an application for the 256 MB system would assume that the first 128 MB of memory is local, and that the second 128 MB of memory is shared memory residing on the SMU. In effect, the application programmer must perform, within the application, many of the functions and services which would otherwise be provided by an OS extension layer. In the foregoing example, the local processor memory and the shared memory are contiguous, with respect to their aggregate memory space, as viewed by the local processor. The 128 MB of shared memory begins at the address immediately following the end of the 128 MB of local processor memory. It should be noted, however, that such contiguous memory spaces are not required by the present invention. For example, a second processor, having only 64 MB may also be coupled to the SMU. Within the memory space of this processor, the first 64 MB comprises its local memory. The next 64 MB comprises an unused and unavailable "hole" within its overall memory space. The next 128 MB comprises the shared memory of the SMU. Applications running on this second processor may be informed of this discontinuous memory space by executing a memory map inquiry API call to an OS extension layer. Alternatively, a modified BIOS may inform the application of the ranges of available memory. In either case, discontinuous memory spaces are supported by the present invention.

The SMU is shown in further detail in FIG. 8 as comprising shared memory banks 110, crossbar switch 150, and memory controller/processor interconnect 400. Memory controller/processor interconnect 400 includes several physical interface components, each similar to the physical interface portion of the MAA's interface control ASIC. Each physical interface component provides the SMU with a port, connecting the SMU to one of the computer systems via a dedicated cable or bus 101. As with the interface control ASIC, the design of the memory controller/processor interconnect's physical interface will depend upon the type of cable or bus 101 selected (i.e., SCI, ATM, FibreChannel, Ethernet, etc.). Moreover, although three such ports are shown in FIG. 8 for illustrative purposes, it is contemplated that a large number of such connections (64 or greater) may be provided.

In addition to a plurality of physical interface components, memory controller/processor interconnect 400 also includes a state machine for controlling both memory read operations and memory write operations to the memory banks 110, in response to access requests [messages] received over the cable or bus 101. Crossbar switch 150 is of the non-blocking variety, and is interposed between memory controller/processor interconnect 400 and memory banks 110 in order to provide multiple, simultaneous accesses to the shared memory.

Memory banks 110 are shown in further detail in FIG. 9 as including a plurality of identically sized, individual memory banks 111, each coupled to a common address bus 112. The lower order bits of address bus 112 are used to address-the memory contents of each bank 111. The highest order bits of address bus 112 are decoded to selectively enable one of the multiple memory banks. Although four memory banks are shown in FIG. 9 for illustrative purposes, it is contemplated that a large number of such banks (64 or greater) may be provided.

Non-blocking crossbar switch 150 is shown in further detail in FIG. 10 as including switch controller 151, read port address bus 152, write port address bus 153, read port multiplexers 154, write port multiplexers 155, memory controller ports 156, and memory bank ports 157. Each memory controller port 156 provides an individual data path between crossbar switch 150 and the memory controller/processor interconnect, via a corresponding data path 158. Accordingly, although three memory controller ports are shown for illustrative purposes in FIG. 10, crossbar switch 150 preferably includes one memory controller port for each connection coupled to the memory controller/processor interconnect portion of the SMU.

Each memory bank port 157 provides an individual data path between crossbar switch 150 and one of the memory banks, via a corresponding data path 159. Although three memory bank ports are shown for illustrative purposes in FIG. 10, crossbar switch 150 preferably includes one memory bank port for each individual memory bank within the SMU.

In response to shared memory read requests forwarded from the memory controller/processor interconnect portion of the SMU, switch controller 151 places high order address information upon read port address bus 152 and, in turn to the select inputs of the read port multiplexers 154. At this time, switch controller 151 commands) one of the read port multiplexers 154, corresponding to the desired target memory controller port, to latch its current select inputs and, in turn, to latch the contents of the read port address bus. Since each read port multiplexer accepts data inputs from each of the memory bank ports, this causes the selected multiplexer to provide a data link, through the crossbar switch, from one memory bank port to one memory controller port. Moreover, since each read port multiplexer 154 latches its select inputs, switch controller 151 may now change the contents of read port address bus 152, in order to provide another, non-blocking read link between one of the memory bank ports and a different memory controller port 156. This is accomplished by commanding a different read port multiplexer 154 corresponding to another target memory controller port, to again latch its current select inputs. In this manner, crossbar switch 150 provides multiple, simultaneous data paths from the memory banks to the memory controller/processor interconnect portion of the SMU. This, in turn, permits multiple, overlapping read access to the shared memory.

In response to shared memory write requests forwarded from the memory controller/processor interconnect portion of the SMU, switch controller information upon of write port address bus 153 and, in turn, to the select inputs the write port multiplexers 155. At this time, switch controller 151 commands one of the write port multiplexers 155, corresponding to the desired target memory bank port, to latch its current select inputs and, in turn, to latch the contents of the write port address bus. Since each write port multiplexer accepts data input from each of the memory controller ports, this causes the selected multiplexer to provide a data link, through the crossbar switch, from one memory controller port to one memory bank port. Moreover, since each write port multiplexer 155 latches its select inputs, switch controller 151 may now change the contents of write port address bus 153, in order to provide another, non-blocking write link between one of the memory controller ports and a different memory bank port 157. This is accomplished by commanding a different write port multiplexer 155 corresponding to another target memory bank port, to again latch its current select inputs. In this manner, crossbar switch 150 provides multiple, simultaneous data paths from the memory controller/processor interconnect portion of the SMU to the memory banks. This, in turn, permits multiple, overlapping write operations to the shared memory.

Note that overlapping read and write operations will only interfere with one another when two such operations attempt to access the same memory bank at the same time. When such collisions occur, the interfering memory requests must be arbitrated. One or more blocked requests must wait for their associated memory banks to become available. Although any suitable arbitration scheme may be used for such collisions, care is taken to avoid any priority-type arbitration method from resulting in locking out one or more computer systems from accessing shared memory for a prolonged period of time. In this manner, the SMU provides the means for performing atomic (i.e., locked/ uninterruptable) memory operations between processor nodes and the shared memory, by permitting a processor node to temporarily lock a region of shared memory and block other node accesses.

Although FIG. 10 shows three read port multiplexers 154 and three write port multiplexers for illustration purposes, many more, on lie order of 64 or more, are contemplated. Note that one read port multiplexer is required for each individual bank within the SMU's memory banks; and that one write port multiplexer is required for each physical interface (and dedicated network link) within the SMU's memory controller/processor interconnect circuitry.

As mentioned above, in addition to a plurality of physical interface components, memory controller/processor interconnect also includes a state machine for controlling both memory read operations and memory write operations to the memory banks 110, in response to access requests received over the cable or bus 101. The state diagram of the state machine controller portion of memory controller/processor interconnect 400 is shown in FIG. 11. Although, in a preferred embodiment, the memory controller/processor interconnect is controlled by traditional, dedicated state machine circuitry, a conventional microprocessor core may be included as a separate entity or within the controller's ASIC, with microprocessor firmware controlling the physical interface components, crossbar switch and memory banks.

Referring to FIG. 11, the memory controller's idle state is state 401, where the controller continuously tests each of the several physical interface components for a new memory request. The result of each test is handled in state 402. If no new request is detected, transition is taken back to state 401. If, however, a new memory request is detected, transition is taken to state 403, where another test is conducted to determine if one or more overlapping requests are in progress. The results of this test are acted upon in state 404. If overlapping requests are detected, transition is taken to state 405, where the overlapping requests and the new request are compared, to determine if the new request is for access to the same memory bank as one of the already-pending requests. Each request's associated memory bank is determined by decoding the higher-order address bits of the shared memory address specified within the overall request message. State 406 takes action upon the results of this test. If a memory bank overlap occurs, transition is taken to state 407, where the current memory request is arbitrated against the overlapping request for the same memory bank. In state 408, an active request is selected from among all pending requests for the same bank, and transition is taken to state 409 to determine if the requested memory bank is still locked.

State 409 can also be reached from state 404, if no overlapping requests are detected. However when state 409 is reached, action is taken on its test in state 410. If the memory bank is still locked, transition is taken to state 411, where the lock is retested. It however, there is no active lock on the selected memory bank, transition is taken to state 412, where a test is performed to determine whether the current shared memory request is a write operation or a read operation. The results of this test are acted upon within state 413. If the operation is a write operation, transition is taken to state 414, where the use table is updated, and state 415, where the data write request is forwarded to the controller portion of the crossbar switch If however, the operation is a read operation, transition is taken to state 416, where the use table is consulted to determine if the current read address is "stale". The result of this test is acted upon in state 417. If the determination is "stale", transition is taken to state 418 to update the data. Otherwise, transition is taken to state 419, where the use table is updated. Next, transition is taken to state 420, where the read request is forwarded to the controller portion of the crossbar switch.

For data read operations, state 421 continuously senses the crossbar switch controller for an indication that data from a pending operation is available. The results of each such test is acted upon in state 422. If no, data is available, transition is taken back to state 421 for continual sensing. If however, read data is available, transition is taken to state 423, where the read data is matched with its associated tag information. In state 424, the read and tag data are formatted into a message for transmission back to the requesting MAA via the dedicated network link.

In another embodiment of the present invention, the interconnected processors are more closely integrated, residing within a common enclosure. Moreover, in this embodiment, the shared memory is distributed into regions associated with each system processor, rather than centralized, as is the prior embodiment. This embodiment is shown in FIG. 12 as comprising system enclosure 500, motherboard 501, power supplies 504, and hard file bays 505. Power supplies 504 preferably include two or more redundant supplies. For. additional fault tolerance, file bays 505 preferably include a configuration of redundant hard disk drives, such as mirrored drives or RAID (Redundant Array of Inexpensive Drives).

Motherboard 501 includes multiple data busses, including conventional system bus 502 and shared memory interconnect bus 503. Conventional system bus 502, which may comprise a conventional PCI bus, is used by each system processor to access common devices and peripherals. Such devices and peripherals may include, among other things, display controllers, modems, and disk drive controllers which, in turn, access disk drives within file bays 505. Shared memory interconnect bus 503 is preferably a high speed, low latency interconnect, such as the standard SCI bus.

Although not readily shown in FIG. 12, motherboard 501 includes sockets for accepting a plurality of processor cards 600. Each socket couples a processor card 600 to both the system bus 502 and the shared memory interconnect bus 503. Although two processor cards are shown in FIG. 12 for illustrative purposes, motherboards capable of accepting a large number of processor cards, such as 64 or more, are contemplated.

In the previously discussed embodiment, dedicated network links were employed to couple each system processor to a centralized shared memory unit. In this embodiment, the shared memory is not centralized. Instead, each processor card 600 includes a region of shared memory, which it makes available to all of the other processors in the system. Each processor dynamically configures its portion of the overall shared memory to reside at a different global memory address, relative to all of the other processor's own portions of shared memory. Via the shared memory interconnect bus, each processor card can individually address and access the shared memory portions of all the other processor cards.

A processor card 600 is shown in FIG. 13 as comprising processor and support circuitry 601, local memory 602, shared memory 603, and Memory Bus Transfer controller (MBT) 610. Processor 601 may be a typical microprocessor, such as an Intel Pentium, together with its support circuitry, or "chip set". The processor's support circuitry includes support for a local memory bus 604, and a bus controller for communicating on the PCI bus 502. Local memory bus 604 allows the processor to access two separate regions of on-board memory. Local memory 602 may only be accessed by processor 601. Shared memory 603, however, may be accessed both by the local processor 601, and other processors residing on other cards within the system, via shared memory interconnect bus 503.

As shown in FIG. 13, MBT 610 is situated between shared memory 603, local memory bus 604, and shared memory interconnect bus 503. A dedicated data, address and control bus 605 couples MBT 610 to the shared memory portion 603 of the processor's memory. MBT 610, in turn, controls accesses to the local shared memory from both local processor 601 and other processors which request access to shared memory 603 via shared memory interconnect bus 503. Moreover, MBT 610 also permits its local processor 601 to access the shared memory portions of other processor cards.

In general, the MBT monitors the address specified by its local processor whenever a memory request (read or write) is placed on the local memory bus. If the request is for local non-shared memory, private to the processor, no MBT intervention is necessary. The processor accesses its local memory via its local memory bus.

If the request is for the local (on-board) shared region, the MBT performs the requisite memory access. For memory writes, an acknowledgement, or handshake, is returned to the local processor, via the local memory bus. For memory reads, the handshake is accompanied by the requested data. If, however, the local processor is addressing memory shared by another processor card, the MBT places a corresponding request (read or write) on the shared memory interconnect bus. For memory write operations, the associated data accompanies the request. When the MBT accepts a response over the shared memory interconnect bus, it relays the results to the local processor. For memory read operations, this response includes the requested data. For memory write operations, the response is an acknowledgement, or handshake.

Moreover, each MBT also monitors the shared memory interconnect bus for requests from other processors (via their own MBTs) for access to the portion of shared memory coupled to the MBT. Each MBT services appropriate requests, performing shared memory writes and reads, and transmitting associated data and handshake/acknowledgements, over the shared memory interconnect bus.

In a preferred embodiment, the MBT comprises an ASIC, and includes traditional, dedicated state machine circuitry controlling overall operation of the MBT. Alternatively, a conventional microprocessor core may be includes within the MBT ASIC, with microprocessor firmware controlling memory access to the on-board shared memory, as well as the on-board processor's requests to off-board shared memory. In addition, the MBT ASIC includes a physical interface circuit. This circuit forms the bridge between the MBT and the shared memory interconnect bus. In a preferred embodiment, the physical interface includes an interface to the SCI bus within the MBT ASIC. Alternatively, the SCI interface may comprise an external SCI interface device, such as those commercially available from LSI Logic Corp. of Milpitas, Calif.

State diagrams of the operation of the MBT are shown in FIGS. 14 through 16. FIG. 14 shows the system bring-up sequence 620 for the processor card. In state 621, upon system power-up, the amount of local memory in each processor is mapped. In state 622, registers within the MBT are loaded with these local and shared address ranges. In state 623, the upper address boundary of local memory is written to a register within the MBT, named LREG; the shared memory low address boundary is written to an MBT register named SREGL, and the shared memory high address boundary is written to an MBT register designated SREGH.

The system operation of the MBT following the system bring-up sequence is shown in FIGS. 15 and 16. Referring to FIG. 15, in state 631, a memory access transaction begins with a processor issuing a (load or store) data request. In state 632, the processor generates the effective address for the relevant memory location and, in state 633, places the address together with its associated control and (for write operations) data on the processor card's local memory bus. In state 634, the MBT loads the address from the local memory bus into its address request register, designated ARR.

In state 635, the MBT compares the contents of the ARR and LREG registers, and the result of the comparison is acted upon in state 636. If ARR is less than or equal to LREG, transition is taken to state 637, where the memory access is deemed to be to local memory. In state 638, the MBT processing of the current processor request is halted, since no further MBT action is warranted. The MBT will then await the next processor memory request, beginning again at state 631.

If, however, ARR is greater than LREG, transition is taken from state 636 to state 639. In state 639, the MBT compares the contents of the ARR and SREGH registers. If ARR is greater than SREGH, the memory access is deemed to be to a portion of shared memory which resides on a different processor card. Transition is taken to state 640, where a tag associated with the memory request is generated. In state 641, the MBT requests access to the shared memory interconnect bus, in order to issue the memory request. In state 642, the MBT tests whether access to the bus was granted. If not, transition is taken back to state 640, in order to retry the bus request. If, however, access to the shared memory interconnect bus was granted, transition is taken to state 643, where the MBT issues the request onto the bus. Transition is taken to state 644, where the MBT waits for a response (data plus handshake/acknowledge for memory reads, handshake/acknowledge only for memory writes) over the bus.

If, in state 639, the MBT determines that ARR is less than or equal to SREGK the memory access is deemed to be to shared memory located on the processor card. Transition is then taken to state 651, discussed in reference to FIG. 16.

FIG. 16 shows the MBT processing of accesses to the portion of overall shared memory situated on its own processor card. Processing of memory requests from both the on-board processor (via the local memory bus) and from external processors (via the shared memory interconnect bus) are shown.

In state 651, the MBT tests both the local memory bus and the shared memory interconnect bus for a memory access request for its assigned (i.e., on board) portion of overall shared memory. The result of the test is acted upon in state 652, where transition is taken either back to state 651, if such shared memory access is requested, or to state 653, if a shared memory request is detected.

In state 653, a test is performed to determine if the requesting processor is the local (on-board) processor. The result of the test is acted upon in state 654, where transition is taken to state 655 if the requesting processor is local, or to state 656 if the requesting processor is off-board. In state 655, a tag is generated for the local processor's memory request, and transition is taken to state 656.

In state 656, a test is made to determine if multiple requests are pending for the MBT's portion of shared memory. The result of the test is acted upon in state 657. If multiple requests are pending, transition is taken to state 658, where the requests are arbitrated. Following arbitration, or if no overlapping requests were detected, transition is taken to state 659, where the MBT tests whether there is a lock (via a semaphore) on the requested memory location. The result of this test is acted upon in state 660. If there is an active lock, transition is taken to state 661, in order to wait for the lock to be released, and then back to state 659, where the lock is retested.

If, however, there is no active lock on the requested location, or if a prior lock has been released, transition is taken to state 671, where the MBT tests whether the current request is a memory read or write operation. The result of this test is acted upon in state 672. If the request is a write request, transition is taken to state 673, where the AMT writes the data accompanying the memory request to the specified address within its portion of shared memory. Transition is taken to state 674, where the use table is updated to reflect the memory access, and then to state 675, where the memory write operation is deemed completed.

If, in state 672, the memory request is a read request, transition is taken to state 676, where the use table is consulted to determine if the current read address is "stale". The result of this test is acted upon in state 677. If the determination is "stale", transition is taken to state 678 to update the data. Otherwise, or after updating the data transition is taken to state 679, where the data within the specified address in shared memory is read. Next, in state 680, the use table is updated. Transition is taken to state 681, where the tags from the use table and data requests are matched. In state 682, the MBT tests whether the processor issuing the current request is the local (on-board) processor. The result of this test is acted upon in state 683. If the requesting processor is local, transition is taken to state 684, where the requested data, together with appropriate acknowledge/handshaking signals, are placed on the local processor's memory bus. If, however, the requesting processor is off-board, transition is taken to state 685, where the MBT requests the shared memory interconnect bus, then waits until the bus is granted. Upon receiving a bus grant indication, transition is taken to state 686, where the MBT places the requested data, together with appropriate acknowledge/handshaking signals, onto the shared memory interconnect bus, where it is subsequently retrieved by another MBT associated with the requesting processor.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A shared memory unit for providing shared memory to a plurality of processor systems, the shared memory unit comprising:

a shared memory comprising a plurality of memory banks;

a plurality of input/output ports, each input/output port being connectable to a processor system by a dedicated data link;

means coupled to the input/output ports for receiving a shared memory access request from a requesting processor;

means coupled to the receiving means for determining the memory bank corresponding to the memory access request;

connecting means coupled to the receiving means, the determining means, and the memory banks, for providing a data path between the input/output port and the memory bank associated with the memory access request;

a memory controller coupled to the connecting paeans and the receiving means, the memory controller performing memory accesses to the shared memory bank through the connecting means in accordance with the memory access request; and means coupled to the memory controller and the input/output ports for generating a shared memory access response for transmission back to the requesting processor system.

2. The shared memory unit according to claim 1, wherein the connecting means comprises a crossbar switch.

3. The shared memory unit according to claim 2, wherein the crossbar switch comprises a non-blocking crossbar switch.

4. The shared memory unit according to claim 1, wherein at least one of the input/output ports comprises a Scalable Coherent Interface.

5. The shared memory unit according to claim 1, wherein at least one of the input/output ports comprises an IEEE 1394 interface.

6. The shared memory unit according to claim 1, wherein at least one of the input/output ports comprises a SCSI bus interface.

7. The shared memory unit according to claim 1, wherein at least one of the input/output ports comprises an Ethernet network interface.

8. The shared memory unit according to claim 1, wherein the shared memory unit further includes means for providing atomic memory operations between at least one of the processor systems and the shared memory.

9. A memory bus transfer controller for controlling accesses to a local portion of distributed shared memory, the memory bus transfer controller comprising:

a local processor memory bus interface coupling the memory bus transfer controller to a local processor and to a memory private to the local processor;

a local shared memory bus interface coupling the memory bus transfer controller to the local portion of distributed shared memory;

a shared memory interconnect bus coupling the memory bus transfer controller to at least one remote memory bus transfer controller associated with at least one remote processor;

first monitoring means coupled to the local processor memory bus interface for monitoring local processor memory bus accesses;

first determining means coupled to the first monitoring means for determining whether a memory address associated with the processor memory bus access corresponds to one of the memory private to the local processor, the local portion of distributed shared memory, and a remote portion of distributed shared memory;

second monitoring means coupled to the shared memory interconnect bus for monitoring remote processor memory access requests;

second determining means coupled to the second monitoring means for determining when a remote processor memory access request corresponds to the local portion of distributed a shared memory; and a memory controller coupled to the first determining means, the second determining means, the local processor memory bus, and the shared memory interconnect bus, the memory controller performing a local shared memory access when the first determining means indicates that a local processor memory bus access corresponds to the local portion of distributed shared memory, sending a shared memory access request to the shared memory interconnect bus when the first determining means indicates that a local processor memory bus access corresponds to a remote portion of distributed shared memory, and performing a local shared memory bus access when the second determining means indicates that a remote memory access request corresponds to the local portion of distributed shared memory;

whereby it is transparent to the local processor whether each of its memory access operations is addressed to the local memory, the local portion of distributed shared memory, or a remote portion of distributed shared memory.

\* \* \* \* \*

UNITED STATES PATENT AND TRADEMARK OFFICE
CERTIFICATE OF CORRECTION

| | | |
|---|---|---|
| PATENT NO. | : 6,519,672 B2 | Page 1 of 1 |
| APPLICATION NO. | : 09/854351 | |
| DATED | : February 11, 2003 | |
| INVENTOR(S) | : Scardamalia et al. | |

It is certified that error appears in the above-identified patent and that said Letters Patent is hereby corrected as shown below:

Column 18,
Line 63, "paeans" should read -- means --.

Column 29,
Line 17, "distribution a shared memory" should read -- distribution shared memory --.

Signed and Sealed this

Twenty-seventh Day of June, 2006

JON W. DUDAS
*Director of the United States Patent and Trademark Office*